US006259090B1

(12) United States Patent
Roberts et al.

(10) Patent No.: US 6,259,090 B1
(45) Date of Patent: Jul. 10, 2001

(54) SUPPORTED THIN FOIL STRIPPER AND SIMPLE NON-OBSTRUCTING POWER METER FOR A SPACE BASED NEUTRAL PARTICLE BEAM SYSTEM

(75) Inventors: Thomas G. Roberts; George R. Edlin; Brian R. Strickland, all of Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 07/023,406

(22) Filed: Feb. 9, 1987

(51) Int. Cl.[7] .......... H01S 1/00

(52) U.S. Cl. .......... 250/251; 376/130; 89/1.11; 324/71.3

(58) Field of Search .......... 376/130, 129; 89/1-11; 250/251; 313/231.01; 315/111.01; 324/71.3

(56) References Cited

U.S. PATENT DOCUMENTS

| | | | | |
|---|---|---|---|---|
| 2,816,243 | * | 12/1957 | Herb et al. | 315/111.01 |
| 3,395,302 | * | 7/1968 | Brown, Jr. et al. | 313/231.01 |
| 3,790,787 | * | 2/1974 | Geller | 250/251 |
| 4,284,952 | * | 8/1981 | Fink | 324/71.3 |
| 4,290,012 | * | 9/1981 | Berte et al. | 324/71.3 |
| 4,700,068 | * | 10/1987 | McClung et al. | 250/251 |
| 4,701,616 | * | 10/1987 | West et al. | 250/251 |

OTHER PUBLICATIONS

Rev. Sci. Instrum., vol. 45, No. 3, 3/74, pp. 378–381, Sharp et al.*

Scientific American, 4 /79, vol. 240, No. 4, pp. 54–65, Parmentola et al.*

Physics Today, 8 /83, pp. 17–20.*

BNL–51762, 3/84, pp. 1–20, Prelec et al.*

* cited by examiner

*Primary Examiner*—Harvey E. Behrend

(74) *Attorney, Agent, or Firm*—Alan P. Klein; Freddie M. Bush

(57) ABSTRACT

A thin foil stripper and simple non-obstructing power meter for a space based neutral particle beam system consisting of a panel of thin foils supported by resistance wires and mounted on a wheel or disk in such a manner that the surface used for stripping the beam may be changed or replaced periodically. The power meter consists of four resistors arranged in the form of a bridge, a power source (battery), a detector (voltmeter), and a display unit (recorded, etc.). Two of the resistors consist of the wires which support the foils and are nearly identical. The other two resistors are used to balance the bridge. When one of the strippers is exposed to the neutral particle beam, the support wire is heated, the resistance changes, and the bridge becomes unbalanced. The magnitude of the voltage produced is proportional to the power in the beam. The power meter is non-obstructing.

7 Claims, 5 Drawing Sheets

SUPPORTED THIN FOIL STRIPPER AND SIMPLE NON-OBSTRUCTING POWER METER FOR A SPACE BASED NEUTRAL PARTICLE BEAM SYSTEM

The invention described herein may be manufactured, used, and licensed by or for the Government for governmental purposes without the payment to us of any royalties thereon.

BACKGROUND OF THE INVENTION

A futuristic look at the United States' defensive weapons system includes visions of space based lasers or particle beams able to direct their energy precisely and devastatingly upon any target. Concepts for the use of high energy particle beams for defense applications have been in existence for more than two decades, and extensive theoretical and experimental efforts have been performed, with many workers having contributed to the development and evaluation of the technology needed to produce these systems. Both ground based and space based systems have been studied. President Reagan has expressed a desire to place more stress on these efforts and the Defense Department has several programs that deal with these directed energy weapons.

One space based system that is currently being developed utilizes neutral particle beams. Contrasted to charged particle beams, neutral particle beams have several inherent properties that make them very attractive for space based applications, in particular, high energy neutral particles propagate in straight lines unaffected by the earth's magnetic field and have a very brief flight time to targets even at extended ranges. In addition, the neutral particles become high energy charged particles upon interaction with the surface of a target and penetrate deeply into the target, thus making shielding relatively ineffective. In the case of a nuclear warhead, these particles are capable of heating the nuclear material by fission processes, neutron generation, and ionization. For nonnuclear heavy targets, heating is produced by ionization, possibly producing kill by thermal initiation of the weapon's high explosive. Also, the response of targets to the high energy neutral particle beam is different for lightweight decoys and massive ICBMs which allow these beams to be utilized in a discrimination role where small kinetic kill vehicles are used to destroy the ICBMs once they have been identified.

Interest in space based application of these beams began when experiments, at the Los Alamos Clinton P. Anderson Meson Physics Facility (LAMPF), on the proton linear accelerator showed several orders of magnitude improvement in accelerator performance. Extensive measurements of beam properties at energies of 211 and 500 Mev showed that the energy spread of the beam was better than 0.5% and the emittance of the beam was better than 0.06 cm-mrad. Also, the LAMPF accelerator had been used to accelerate $H^-$ ions to energies above 100 MeV with their behavior being similar to that for protons. These achievement prompted Knapp and McNally to write a LANL report entitled "SIPAPU" in which they proposed a satellite-based high energy neutral hydrogen weapon; (see SIPAPU Report LA-5642-MS, Los Alamos National Laboratory, July 1974). Their device is depicted schematically in FIG. 1, where an intense, high quality beam of $H^-$ ions is generated and accelerated to an energy of approximately 250 MeV. After acceleration, the beam is expanded and passed through final focusing and steering magnets. The diameter of the beam in the accelerator and beam transport sections is measured in mm, but after expansion the diameter of the beam is of the order of a meter. Therefore, the beam area has been increased by a factor of the order of $10^6$ and the current density has also been decreased by this same amount. This low current density beam is subsequently neutralized by stripping the weakly bound electron from the $H^-$ ion and the resulting hydrogen beam propagates toward the target unaffected by the earth's magnetic field. Both the system and the target must remain above approximately 250 kilometers during the engagement in order to minimize beam degradation due to collisions with residual gases in the atmosphere. However, this does not preclude the system being used in a pop-up fashion where the weapon is rocket borne for use in a fly-by or a fly-alone mode for either discrimination, target kill, or both.

Improvements in the state-of-the-art for intense high quality (high brightness) negative ion sources and lightweight efficient accelerators have been made. However, additional improvements are needed, and improvements in the state-of-the-art for compact lightweight power systems and for high current neutralizer techniques without excessive scattering are necessary before a device like this can be considered viable. Also, methods for neutral beam detection, signatures for closed loop tracking, for kill assessment, and techniques for rapidly steering the beam over larger angles are also needed.

Although, there are many practical issues to be considered, there does not appear, in principle, to be any inherent limitations that deem the device inviable. Many of the practical issues have been overcome and others are being addressed by the (Now SDIO/U.S. Army Strategic Defense Command (USASDC)) Neutral Particle Beam program. However, the current solutions for neutralization of the $H^-$ ion beam all have serious adverse systems implications.

After the $H^-$ beam has been accelerated, expanded, aimed, and focused on the target, it must be neutralized. This can be accomplished by a number of techniques. For example, photodetachment, plasma, or gas stripping have been considered. Photodetachment causes less degradation in beam quality and can result in the largest fraction of the negative ion beam being converted to a neutral beam. Unfortunately, extremely high energy CW lasers at wavelengths where these power levels are not currently available are required for this purpose, and even if they become available, they would probably be as large or as expensive and require as much prime power as the rest of the system. Since open ended plasma strippers with quiescent plasmas would cause less degradation in beam quality than a gas stripper, they also have been studied. But, the power requirement for the plasma stripper alone is equal to or greater than that for the rest of the system. Also, it is problematical that a sufficiently quiescent plasma could be produced. Therefore, considerable work both theoretical and experimental has been devoted and is being devoted to the development of a gas stripper. The important results of this work is summarized in FIG. 2 where the fraction of the initial beam which survives as $H^-$, which is stripped to $H^o$, and which is stripped to $H^+$ is given as a function of the stripper thickness. Also, shown is the component of the $H^o$ beam which has not been elastically scattered (i.e., the useable part of the $H^o$ beam for targets at long ranges) and the component of the $H^o$ beam which has been elastically scattered (this is useful for beam sensing purposes).

As a result of this work a gas stripper is now included in current neutral particle beam weapon concepts. However, this is also an open system where gas escapes out the ends. Part of the gas, which escapes, expands back into the optical system where stripping collisions occur before the beam has been made parallel and these particles are therefore not directed toward the target. Part of the gas also escapes out in the forward direction where additional stripping collisions occur producing $H^+$ particles which do not reach the target because of the effect of the earth's magnetic field. Thus, there is clearly a need for a better and more efficient way to neutralize the $H^-$ ion beam into $H^o$ neutral beams.

This need has been partially met by the teaching of Roberts, Havard, and Wilkinson in U.S. patent application Ser. No. 397,371 titled "Solid Stripper for a Space Based Neutral Particle Beam System." This neutralizer is shown in FIGS. 3, 4, and 5 where it may be seen to include a housing 10 which has a window opening 12 therethrough that is approximately 2 meters square. Inside housing 10, (see FIG. 4) reels 14 and 16 are mounted in a conventional manner with solid state stripper material 18 wound thereon. Reel 16 is a take-up reel and is motor driven by motor 20 (see FIG. 3) to move solid state material 18 past window 12 as the ion beam is passed through solid state material 10 as S illustrated in FIG. 5. Provisions are also made for discharging any charge accumulated on solid state material 18 by providing a conventional ground as it is taken up by reel 16.

In operations when the high energy $H^-$ beam is turned on, so is motor drive 20 which moves solid state stripper material 18 past window 12 at a linear speed of about 2 meters/sec. When the high energy $H^-$ beam is turned off, so is motor 20 for the take-up reel 16.

As can be seen, this solid state stripper is simple and requires negligible power. However, the thin foils are made of polyvinylidene chloride, mica, cellophane, and other similar materials, and the life time of such foils are limited to a few hundred mecro-ampere-hours. Also, the creation of such foils at optimum thickness even for 250 MeV $H^{-1}$ beams at current densities of 10 $\mu$amp/cm$^2$ or greater is at best problematical. Such foils might be made as large as 0.3 meters but even these are very fragile. Foils thickness for lower energy applications such as antisatellite and discrimination need to be thinner and are very fragile even in much smaller sizes regardless of the material from which they are constructed.

Also, at the present time, only beam sensing diagnostics are planned after the beam has been expanded. These diagnostics are to determine to a high accuracy the direction in which the neutral particle beam has been pointed. These techniques assume that the beam profile is gaussian like and attempts are made to determine the beams centroid. A beam diagnostic technique is needed for measuring or determining both the power in the beam and the beams actual profile in a manner which does not attenuate, destroy, or distort the neutral particle beam.

Therefore, it is an object of this invention to provide a neutralization device that overcomes the defects of the Ser. No. 397,371 and extends its use to application at lower energies requiring thinner foils.

Another object of this invention is to provide a nonobstructing power meter that measures the output power of the weapon system without appreciably effecting or interferring with the use of the beam.

A still further object of this invention is to provide a device which can be used to obtain information on the spatial distribution of the current in the outgoing particle beam.

Additional objects and advantages of this invention will be obvious to those skilled in this art.

SUMMARY OF THE INVENTION

In accordance with this invention, a solid state stripper for stripping $H^-$ ion beams to $H^o$ ion beams is provided by providing a very thin material which has been supported in such a manner that only small portions are selfsupporting. The supports are also thin and intercept only a small fraction of 1% of the beam. This supported foil can be rolled from one reel to another reel in less than on sec per meter. Thus, as the $H^-$ ion beam is passed therethrough striking the thin material between the supports, the loosely bound electrons of the $H^-$ ion beam are knocked loose and the ion beam emerges on the opposite side of the solid state stripper as an $H^o$ ion beam.

In another embodiment, supporting material is made of wires which serve as a resistor. There are four resistors arranged in the form of a bridge, a power supply (battery), a detector (voltmeter), and a display unit (recorder or computer). The other resistors are used to balance the bridge. When the resistor made of the supporting wires is exposed to the beam, the wire supporting material is heated. The resistance changes, and the bridge becomes unbalanced. The magnitude of the voltage produced is proportional to the power in the particle beam.

In yet another embodiment, the supporting wires consists is of 40 wire resistors arranged so as to sample the energy in the beam at different locations. Each resistor is part of a bridge which includes three other resistors, a power supply, a detector (voltmeter) and a display unit (computer or recorder). One of the three additional resistors for each bridge may be an additional set of 40 wires which are made nearly identical to the set being used to sense the beams intensity distribution. When the 40 wires are exposed to the beam, the wires are heated, their resistance changes, and the various bridges become unbalanced. The magnitude of the voltage produced in each bridge is proportional to the energy in the particle beam integrated over the location occupied by the wire in the bridge. This embodiment is mounted on a wheel or large disk which contains many of the supported thin foil strippers. More than 40 wires may be used if better resolution is required.

DETAILED DESCRIPTION OF THE PREFERRED EMBODIMENTS

Figure 1:
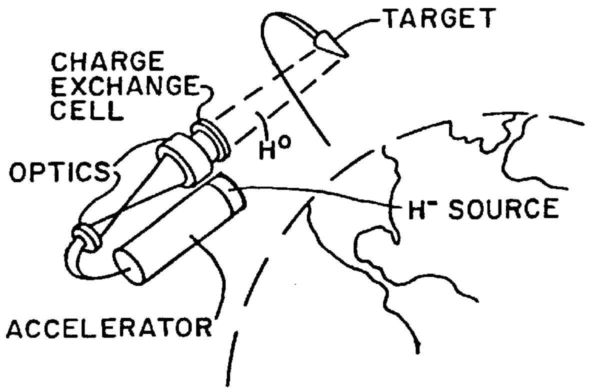
FIG. 1 PRIOR ART
FIG. 1 is a schematic illustration of a space based neutral particle beam system.
Figure 2:
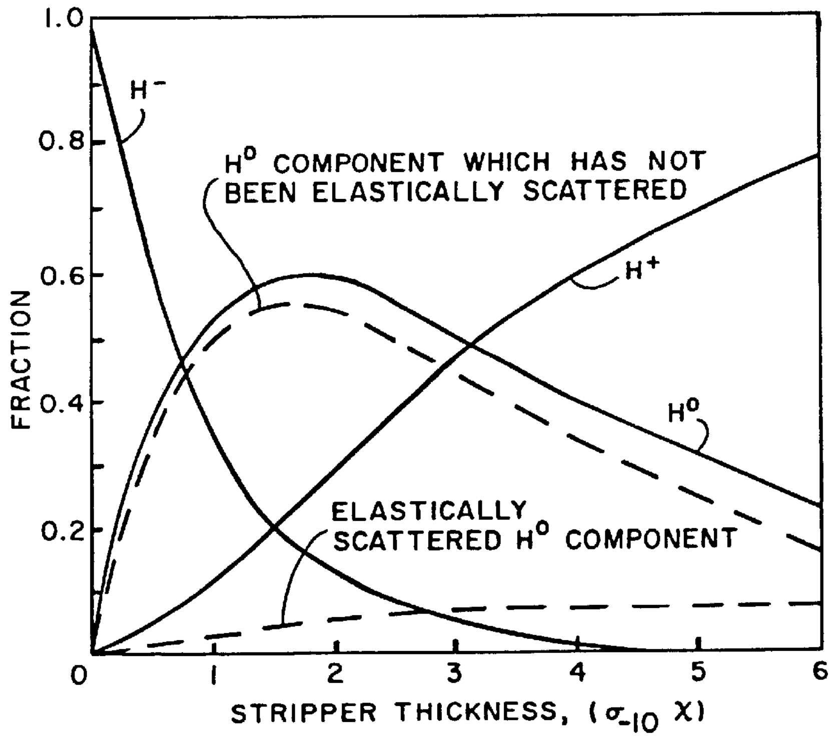
FIG. 2 is a graph illustrating summarized work relative to stripper development.

It has been shown that the stripping efficiency and the resulting scattering of the ions is nearly independent of the material from which the stripper is made when the thickness is measured in gm/cm$^2$. For a space based system of the type referred to in the background of this invention where a high quality beam of $H^-$ ions is generated and accelerated to an energy between 25 and 250 MeV, a stripper whose thickness is between 3 and 30 micrograms per square centimeter is required. The thinnest foils are used with the lower energies. As can be seen in FIG. 2, the variation of stripper efficiency with thickness is fairly flat and foils approximately twice this thick may be used without much loss in effectiveness. Thin foils are now used in particle accelerators where fast particle beams are passed through thin foils for the purpose of neutralizing these beams. These foils are quite satisfactory under certain conditions and unsatisfactory under other conditions. For example, these foils are unsuitable at high currents and even at low currents their lifetime is limited to a few hundred micro-ampere hours, and they are fragile so that they can only be made and maintained in small sizes. As the energy of the $H^-$ ions that are to be neutralized is decreased, the required thickness of these foil strippers is also decreased which only compounds the problem of their being fragile and difficult to maintain.

It is possible to make these foils less fragile without making them thicker. This is accomplished by attaching the foils to a set of supporting fibers loosely woven in such a manner that all parts of the foils between the supports are relatively small say 100 cm$^2$ or less. This is shown in FIG. 6 where the solid state stripper 60 is divided into squares which are supported by vertical fibers 62 and horizontal fibers 64. The horizontal fibers 64 are anchored or held in place by the side bands 66 and 68. The thin foil materials of 60 may be the same as that of FIGS. 3, 4, and 5 or since each square has to support its self over a much smaller cross section, it may be made from other materials now used in the art such as carbon and metals. The size of the support fibers 62 and 64 are such that they intercept only a very small fraction of the particles in the $H^{-1}$ ion beam, say about one percent. The thickness of these fibers is such that the particles which are intercepted are stripped of both electrons and emerge as $H^+$ particles and are lost to the $H^o$ beam. However, in going through the fibers, these particles lose only a very small fraction of their energy. The amount of energy given up to the fibers depends on their thickness in gm/cm$^2$ and on the particle energy at which the system is designed to operate with more energy being given up to the fibers at the lower operating energies. The fibers may be made of any convenient material such as metals like tungsten, Nichrom, stainless steel, chromel, alumel, etc, or plastics, or glass like some of the modern optical waveguides. (The rejects from optical waveguide runs could be used.) These fibers are thin (like one mil or so) but they are thick compared to the material they support. The effect of varying the diameter or thickness of the support fibers is to vary their temperature rise per second that when they are exposed to the high energy $H^-$ beam. For a given energy of the $H^-$ beam, this is a linear effect because, for a given length fiber, the cross-section section, volume, and, therefore, the mass varies as $R^2$. But the surface area as seen by the beam and, therefore, the portion of beam intercepted by the fiber varies as $R^2$. Thus, the temperature rise per second will vary as $R^{-1}$, where R is the radius or diameter of the fiber. This relation is used to select the size fiber to be used for support. For example, if tungsten is used with a 250 MeV, 10 $\mu$Amp cm$^2$ beam of $H^-$ ions, then the diameter of the fiber is chosen to be 1 mil ($2.5\times10^{-5}$ m). This choice holds the temperature rise in the fibers to less than 100° K per second. The size of the fibers made from other materials will depend on their density and specific heats.

Figure 3:
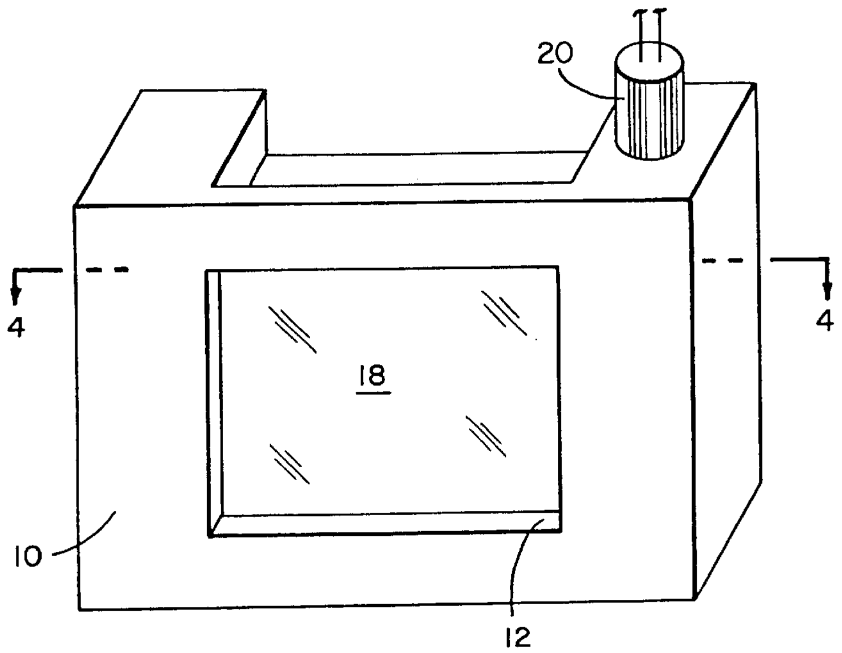
FIG. 3 is a perspective view of a solid state stripper.
Figure 4:
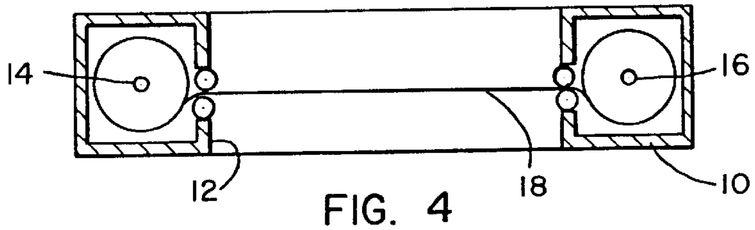
FIG. 4 is a sectional view taken along line 4—4 of FIG. 3.
Figure 5:
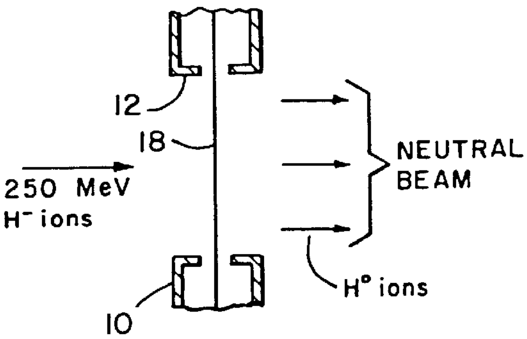
FIG. 5 is a schematic sectional view illustrating passing of $H^-$ ion through solid state stripper to produce neutral beam.
Figure 6:
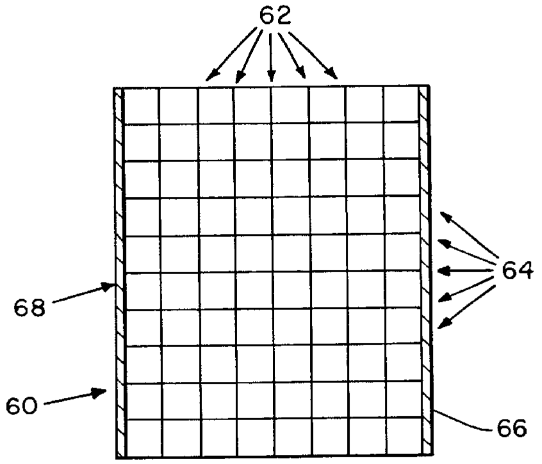
FIG. 6 is a schematic illustration of the supported thin foil stripper in accordance with this invention.
Figure 7:
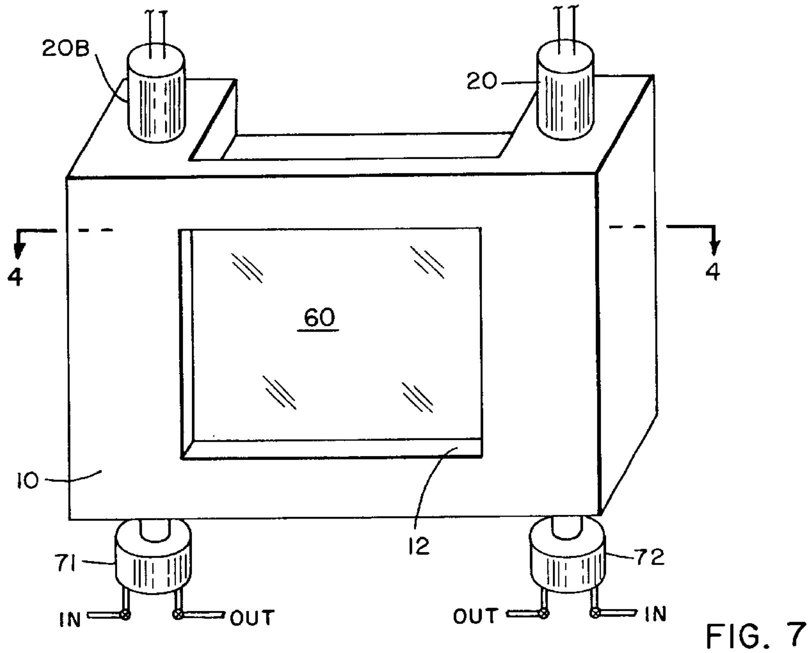
FIG. 7 is a schematic view illustrating the cooling sections which have been added. An additional motor has also been added so that the stripper foil can be run in both directions, that is from one reel to the other and back again, etc.

This supported solid state stripper 60 is now used in FIG. 3, 4, and 5 in place of the material 18. The device of FIGS. 3, 4, and 5 is also modified in the following manner as indicated in FIG. 7, where an additional motor 20B has been added so that the material 60 can be run back and forth between reels 14 and 16 (shown in FIG. 4). Also, to the housing 10 of FIG. 3 there has been added cooling 71 and 72 (details not shown) to each side of 10 for the purpose of dissipating the heat developed in the supported thin foil solid state stripper and reducing its temperature prior to the time that it is passed through the high energy $H^-$ beam.

Figure 8:
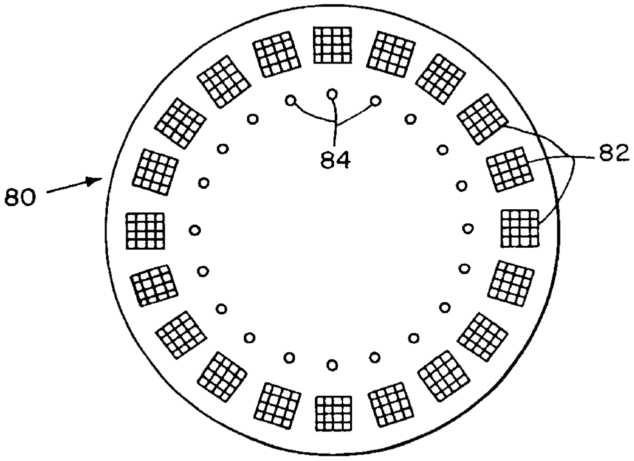
FIG. 8 is a schematic illustration of a large wheel or disk on which the supported thin foil strippers are mounted.
Figure 9:
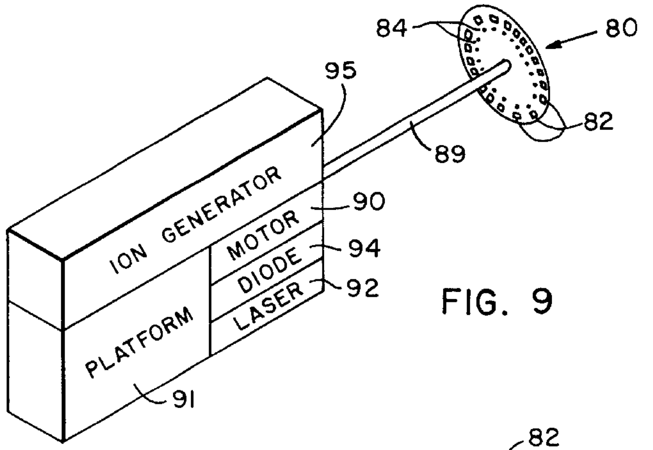
FIG. 9 is a schematic illustration of a space based neutral particle beam system utilizing the wheel mounted supported thin foil strippers.

Another embodiment is illustrated in FIGS. 8 and 9. FIG. 8 shows a large wheel 80 which contains a multiplicity of the supported solid state strippers 82 and a multiplicity of a small mirrors 84. In FIG. 9, the wheel or disk 80 on which the solid state strippers 82 are mounted is rotated by a shaft 89 and motor 90 which is mounted on the space platform 91. There are guides (not shown) located elsewhere on the space platform to help keep the disk 80 properly aligned. To insure that each stripper is in the proper position when the beam of $H^-$ ions from ion generation 95 is to be neutralized, a small cw laser 92 such as a He—Ne laser is used to reflect light from the mirrors 84 to a photodiode 94. The output of this photodiode is used to control the motor 90 so that each stripper is properly positioned in its turn.

Each solid state stripper is used for only a few seconds (depending on its construction and the level at which the system is operated) before it is replaced by the next stripper. Thus if n strippers are used then each stripper sees only 1/n of the pulses from the weapon. During the time that each stripper is not being used, it is allowed to cool or recover to ambient conditions before it is used again. Since these space platforms are larger, the disk is large and contains many strippers (say 30 or more) and the wheel will have to be rotated at speeds of less than one revolution per minute. This wheel or disk could be operated and advanced like the wheels in the new disk cameras as an alternative method of positioning the strippers.

Figure 10A:
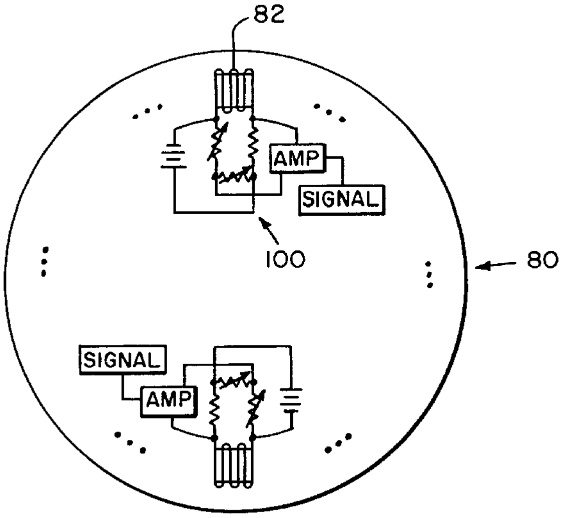
FIGS. 10A and 10B are schematic illustration indicating the wire supports being used as a power meter.
Figure 10B:
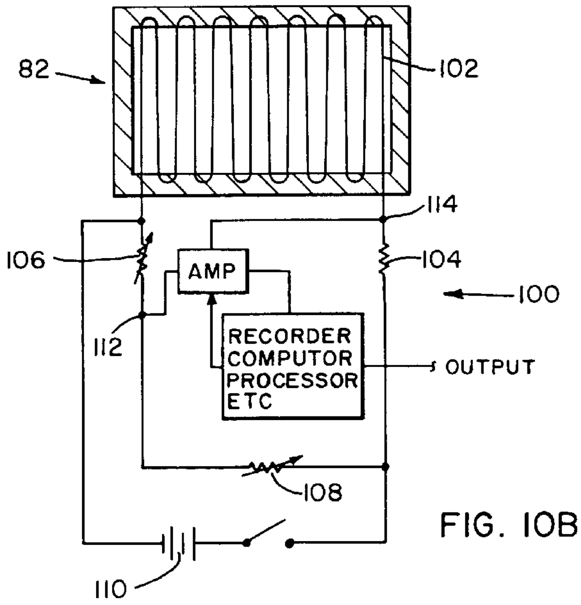
Figure 12:
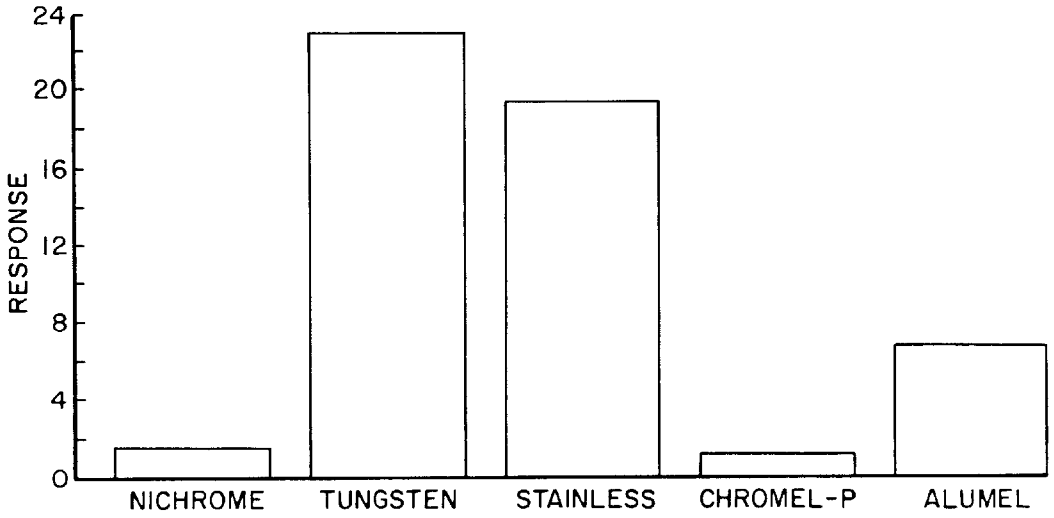
FIG. 12 is a plot of the relative response of the power meter for several different wire types.

In yet another embodiment of this invention, the supporting wires in one plane are continuous and are arranged so as to form a simple power meter for the $H^-$ ion beam. As illustrated in FIGS. 10A and 10B, this simple power meter consists of a bridge circuit 100 made up of nearly identical resistor wires 102 and 104 and two additional resistors 106 and 108 with power being supplied by a battery 110. The resistor 102 is the support wire of the solid state stripper being used to neutralize the $H^-$ ion beam. The other resistors are used to balance the bridge. When the bridge is balanced, there is no voltage between points 112 and 114. But, when the $H^-$ ion beam is allowed to pass through the stripper the supporting resistance wire structure 102 intercepts a small portion of the ion beam, causing the temperature and, therefore, the resistance of the wire to increase. This unbalances the bridge which produces a potential difference between 112 and 114 that is proportional to the increase in resistance and, therefore, the power in the $H^-$ ion beam. This signal is amplified and displayed, recorded, or used for control purposes. This signal can also be used to determine when the solid state stripper needs to be changed. There can be n bridge circuits for the n solid state strippers with the circuits being mounted on the disk and with each bridge being balanced just prior to its stripper being placed in the beam; or there can be one bridge circuit mounted on the platform with arrangements being made for obtaining proper electrical contact with the resistor 102 of the stripper being used. Since these circuits can be quite simple, small, and inexpensive, it is desired to use the n circuits in order to have redundancy, reliability, and increased confidence in the system. If one mil tungsten wire is used, the response time is less than 100 $\mu$sec. For larger diameter tungsten wires the response time will be linearly increased with the diameter of the wire. In any case, the response time is fast enough to detect changes of interest in the $H^-$ ion beams power. It is not clear from which material it would be best to construct the supports for the stripper and therefore the resistors for the power meter. The calculated relative response of the power meter for five different wire materials after absorbing the same amount of energy from the $H^-$ beam is shown in FIG. 12. It may be seen that alumel is approximately 6 times more sensitive than chromel-P and stainless is some 20 times more sensitive than chromel-P. Tungsten is a little more sensitive than stainless. It has also been found that tungsten can be made in wires with diameters of $2.54\times10^{-5}$ meters or less and they are not brittle and can be wound so as to be used in this embodiment. Therefore tungsten is our preferred embodiment. Here again the actual wire diameter used will depend on the density, specific heat, and the temperature coefficient of resistivity and the energy of the $H^-$ beam to be neutralized in addition to other properties. The size is adjusted so as to control the magnitude of the temperature rise during the time that each solid state stripper is to be used.

Figure 11:
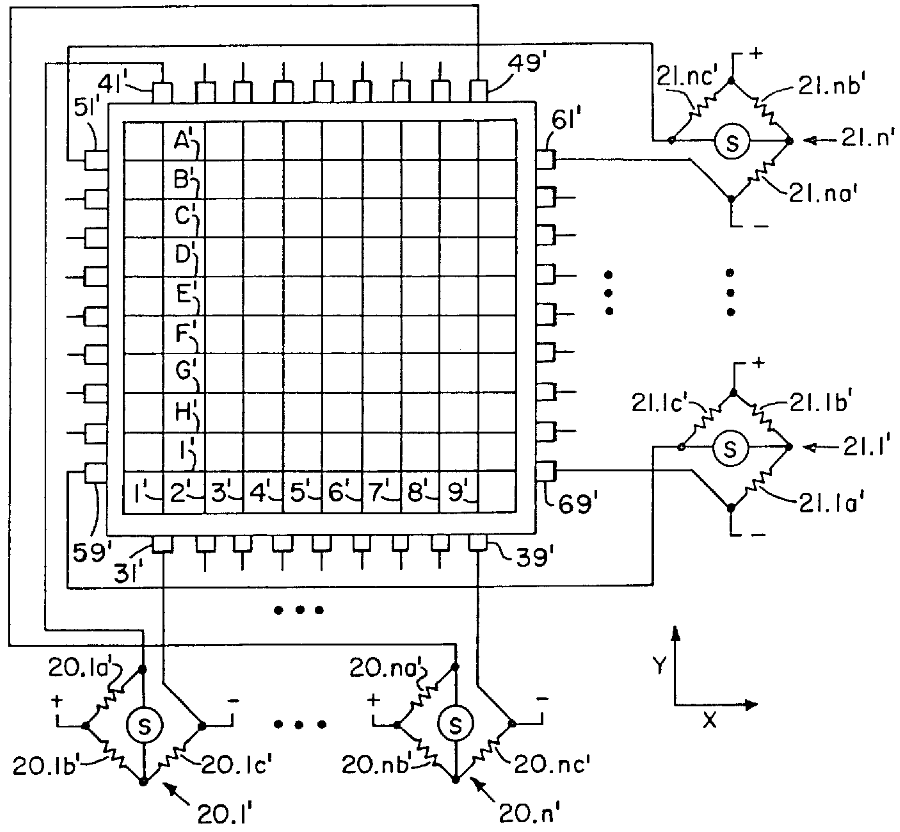
FIG. 11 is a schematic illustration of the wire supports wired for use as a beam sampling meter.

The final embodiment is illustrated in FIG. 11 which shows how the support of the solid state strippers are wired for use as a beam sampling meter. The $H^-$ ion beam sampling meter 200 consist of a multiplicity of separate wires (1', 2', . . . ) and a second mulitplicity of wires (A', B', C', . . . ) which are positioned perpendicular to the first multiplicity of wires. These two sets of wires are also positioned one behind the other. This configuration may be used without the solid state stripper material to interrogate the $H^-$ beam, in which case the two sets of wires do not touch each other. It may also be used with the solid state stripper material, in this case the two sets of wires are on separate sides of the stripper material and are insulated (as the wires in a transformer are insulated) if the thin material from which the stripper is made is conducting. The wires are tungsten and the number of wires used depends on the precision required. The spacing between the two sets of wires is not critical and is determined by convenience of construction. Each wire constitutes one leg of a resistance bridge which is used to determine the change in resistance of this particular wire when it is exposed to the beam. Therefore, if there are n wires in each set, there will be 2n bridges used to produce the data set for each measurement. Each bridge includes three other resistors eg. 20.1*a*', 20.1*b*' and 20.1*c*'. Each bridge is supplied with a low voltage DC power, and there is an output voltage from each bridge which is recorded and used to produce the final data. However, 2n power supplies are not necessary since two constant voltage power supplies are sufficient. Each end of the wires are fastened to a conducting post (copper) by the use of a conducting epoxy and the bridge connections are made to these metal posts. Other techniques for mounting the wires may also be used. All of the bridges are mounted on the disk which contains the supported solid state strippers. The data from each of the horizontal wires (A',B',C', . . . ) are used to produce a plot of the power in the beam as a function of say Y. Here the power has been integrated along X at each Y location by the wire located there. The data from the perpendicular wires are used to produce a plot of the power in the beam as a function of X. In this case the power has been integrated along Y at each X location by the wire located there. These two sets of data are processed by an on-line minicomputer to display the data in several forms including contour plots which are an especially useful diagnostic for determining the weapons operating conditions.

In using this device it is necessary to have some a prior information about the shape of the beam that is to be characterized. This results because only 2n measurements are made and $n^2$ measurements are required to uniquely characterize the beam. Thus, in special cases, it is possible for the device disclosed here to produce the same display for two beams that have different spatial power distributions, and some information about the general shape of the beam is necessary in order to properly interpret the data. However, in nearly all cases, this information is readily available from measurements made elsewhere in the beam line.

We claim:

1. In a system for producing a beam of accelerated neutral particles, means for providing a beam of accelerated $H^-$ negative ions and for expanding said beam of said $H^-$ negative ions, means for neutralizing said accelerator and expanded beam of $H^-$ negative ions, means for neutralizing said accelerator and expanded beam of $H^-$ negative ions, means for moving said neutralizing means at a substantially constant rate sufficient to prevent destruction of said neutralizing means as said accelerated and expanded beam of $H^-$ negative ions pass therethrough, said neutralizing means comprising a foil stripper having a thickness such that it is less than 30 micrograms per square centimeter, a set of fiberlike means for supporting said foil stripper, and said means being woven into said stripper such that all parts of the stripper between said means are 100 $cm^2$ or less.

2. A stripper as set forth in claim 1 wherein said means are fibers arranged in vertical and horizontal fashion, and side bands around said stripper for anchoring said fibers.

3. A stripper as set forth in claim 2 wherein said foil stripper is made of carbon.

4. A stripper as set forth in claim 1 wherein said means are resistors, and circuit means connected to said resistors for measuring their characteristics.

5. A system as set forth in claim 1 wherein the moving means comprises a disc having therein a plurality of slots each of which is provided with a foil stripper.

6. A system as set forth in claim 5 wherein the system is provided with means for sequentially aligning the foil strippers on the disc with the beam to be neutralized.

7. The system as set forth in claim 6 wherein the fiberlike means are resistors and circuit means are connected to the fiberlike means for measuring the resistance of said means.

* * * * *